United States Patent [19]

Saliba

[11] Patent Number: 5,523,904
[45] Date of Patent: *Jun. 4, 1996

[54] LINEAR TAPE WRITE SERVO USING EMBEDDED AZIMUTH SERVO BLOCKS

[75] Inventor: George A. Saliba, Northboro, Mass.

[73] Assignee: Quantum Corporation, Milpitas, Calif.

[ * ] Notice: The term of this patent shall not extend beyond the expiration date of Pat. No. 5,371,638.

[21] Appl. No.: 265,529

[22] Filed: Jun. 24, 1994

Related U.S. Application Data

[63] Continuation-in-part of Ser. No. 222,491, Apr. 1, 1994, Pat. No. 5,371,638, which is a continuation of Ser. No. 903,641, Jun. 24, 1992, abandoned.

[51] Int. Cl.⁶ .................................................. G11B 5/584
[52] U.S. Cl. ............................ 360/77.12; 360/76
[58] Field of Search .......................... 360/77.12, 77.13, 360/77.14, 77.15, 77.16, 76, 77.01

[56] References Cited

U.S. PATENT DOCUMENTS 5,371,638  12/1994  Saliba ................................... 360/77.12

FOREIGN PATENT DOCUMENTS

0459732B1  3/1995  European Pat. Off. .
4-32014    2/1992  Japan ................................. 360/77.14

Primary Examiner—Aristotelis Psitos
Assistant Examiner—James L. Habermehl
Attorney, Agent, or Firm—David B. Harrison; John C. Chen

[57] ABSTRACT

A method of adjusting the lateral position of writing on a magnetic tape. A magnetic tape recording is provided having a first track including alternate data and servo information wherein the data is written at a first azimuth angle and the servo information is written at a second azimuth angle, and having a second track including alternate data and servo information wherein the data is written at the second azimuth angle and the servo is written at the first azimuth angle. The first track is monitored during writing of the second track for the presence of servo blocks. Writing in the second track is interrupted upon the sensing of alternate servo blocks in the first track. Amplitudes of servo blocks received during writing are compared with amplitudes of alternate servo blocks received while writing is interrupted, and the lateral position of writing is adjusted in response.

10 Claims, 10 Drawing Sheets

LINEAR TAPE WRITE SERVO USING EMBEDDED AZIMUTH SERVO BLOCKS

This is a continuation-in-part of U.S. patent application Ser. No. 08/222,491 filed on Apr. 1, 1994, now U.S. Pat. No. 5,371,638, which is a continuation of U.S. patent application Ser. No. 07/903,641 filed on Jun. 24, 1992, abandoned.

BACKGROUND OF THE INVENTION

This invention relates generally to magnetic storage devices and particularly to a method and apparatus for achieving very high track densities in a magnetic tape recording system.

The constantly increasing operational speeds of digital computers are creating a demand for corresponding increases in the data storage capacities of magnetic tape recording and reproducing systems, while maintaining the special requirements of high speed digital tape systems.

Tape recording and reproducing systems for use as computer data storage devices are required to provide high data transfer rates and to perform a read check on all written data. To satisfy these requirements, conventional tape systems typically employ methods of recording known as linear recording, in which the tracks of data lie parallel to each other and to the edge of the tape, or helical scan recording, in which the tracks of data lie parallel to each other but diagonal to the edge of the tape. The linear recording method offers higher data transfer rates; however, it is desirable to obtain higher data densities while retaining the advantages of this method. Various methods of increasing tape track densities have therefore been pursued.

A method of recording known as azimuth recording has been used in helical scan recording systems, and has recently been applied in linear tape systems to increase the track density of these systems. Azimuth recording results in a recorded track pattern in which the magnetization directions of adjacent data tracks lie at different azimuth angles to each other. This method greatly reduces inter-track crosstalk, allowing tracks to be placed closer together. The need for guard band spaces between tracks or wide write heads is thus reduced or eliminated.

Tape track densities are further limited, however, by lateral tape motion, which is the random and unavoidable tendency for a tape to drift in a direction lateral to the direction of tape motion. During a tape write, lateral tape motion causes track directions to deviate from the parallel to the edge of the tape. During a read, lateral tape motion causes misregistration of the read head over the track being read. This misregistration results in read data error. Further error can be introduced by lateral motion of the write head during writing. Tape track densities are limited by crosstalk, which occurs when reading is interfered with by data of adjacent tracks. Crosstalk is exacerbated by error in head gap alignments. Some methods have been implemented to minimize this effect, such as leaving guard bands between tracks, or using wider write head gaps. These methods, however, limit track densities.

Servo tracking techniques have been developed to reduce the effects of tracking error due to lateral tape motion and head mis-alignment, and thus improve the data capacity of tape systems. Known servo techniques vary widely, but most involve methods of dynamically moving the read head gap to continually re-position it over the written data track. The movement of the read head gap compensates for lateral tape motion during reading. However, lateral tape motion during writing is not controlled with respect to the write head gap; thus, the distance between tracks is still limited to the magnitude of the lateral tape motion in order to avoid over-writing previously written tracks.

One method of compensating for lateral tape motion during writing involves embedding low frequency servo bursts within the tracks and then using the servo bursts in an adjacent previously written track to control the lateral position of writing a current track. Writing continues during the reading of a first servo burst, and is discontinued during the reading of a second servo burst. The difference in amplitude received from the servo burst reads indicates the proximity of the write head to the previously written track, and the position of writing can be adjusted in response.

The low frequency nature of the servo bursts renders them discernible by a read head in an adjacent track, but requires the use of a second low frequency read channel in addition to the data read channel. It is desirable to provide a simplified, low cost servo tracking mechanism to control the effects of tracking error during writing without the need for a separate low frequency read channel.

SUMMARY OF THE INVENTION

In accordance with the present invention, there is provided a method which achieves very high magnetic tape track density through the use of a head position servo during writing, while satisfying the requirements of computer data applications.

According to one aspect of the present invention, a magnetic recording medium is provided having data and servo information provided thereon. A track on the medium includes alternate data and servo information along the track, the data written at a first azimuth angle, and the servo information written at a second azimuth angle. A second track on the medium also includes alternate data and servo information, the data in the second track written at the second azimuth angle, and the servo information written at the first azimuth angle.

According to another aspect of the invention, there is provided a method of writing the recorded pattern. According to this method, alternate data and servo information are written in a first track at a first azimuth angle. Alternate data and servo information are then written in a second track on the medium at a second azimuth angle. During writing of the second track, writing is interrupted at positions coinciding with the positions at which servo information was written in the first track. More particularly, the second track is written at a lateral location on the tape such that a portion of the first track is overwritten by the writing of the second track; thus, the interruption of writing in the second track leaves the servo information which was written in the first track embedded in the second track.

According to a third aspect of the present invention, there is provided a servo which controls the position of the magnetic head during both writing and reading to and from a tape. According to this servo, during writing of a track, the tape is monitored for servo information in an adjacent track. The lateral position of the write head gap of the magnetic head is adjusted based on the amplitude of the difference between alternate servo information read as compared to a reference value. In a specific sense, tracks include intervals of data interspersed with alternate intervals of even and odd servo blocks. As a track is written, writing is disabled during the presence of an odd servo block in the adjacent, previously written track. The difference in amplitude between even and odd servo information read from the adjacent track is compared to a reference differential, and the lateral position of the write head gap is adjusted based on the result of the comparison to maintain a substantially contiguous relationship between tracks.

These aspects of the invention are combined to provide a magnetic tape recording system suited for computer data applications in which the data capacities are greatly increased over those of the prior art.

DETAILED DESCRIPTION OF THE PREFERRED EMBODIMENT

Figure 1:
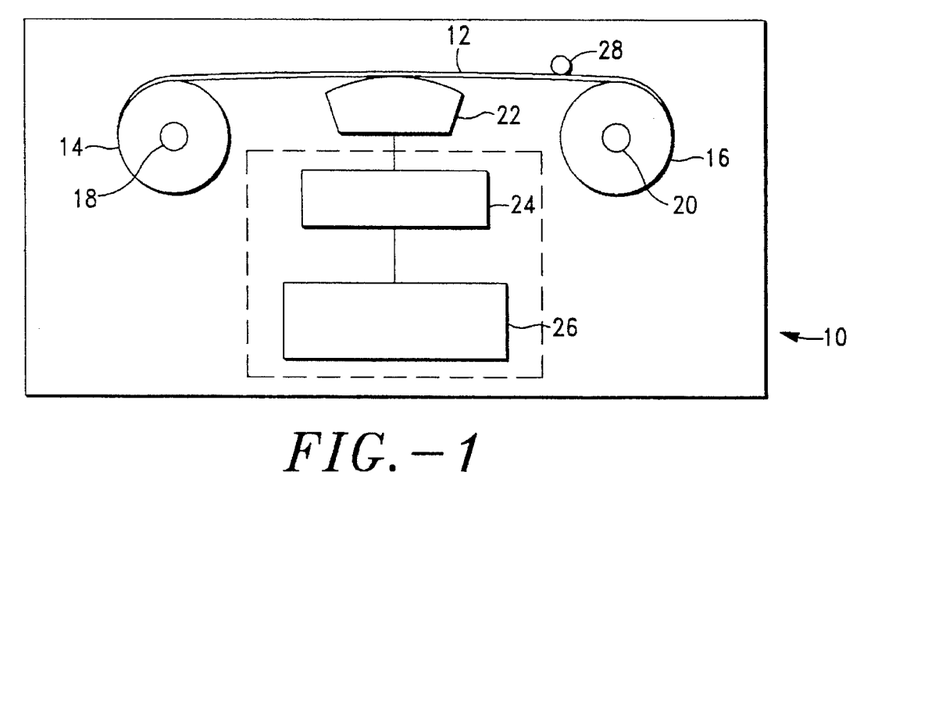
FIG. 1 is a schematic view of a magnetic tape system according to the principles of the invention.

FIG. 1 shows a magnetic tape system 10 for azimuth recording at very high track densities on a magnetic tape 12. The tape reels 14 and 16 are mounted on rotatably driven reel drive motors 18 and 20. The reel drive motors 18 and 20 rotate the reels 14 and 16 to move the tape 12 in a forward direction from the reel 14 to the takeup reel 16. As the tape 12 advances, it moves across the magnetic head 22, which writes linear tracks of data onto the tape 12. The magnetic head 22 contains separate write and read head gaps, allowing read checking of written data. When the entire length of the tape 12 has been transferred from the tape reel 14 to the reel 16, the direction of rotation of the reel drive motors 18 and 20 is reversed. The tape 12 now advances across the magnetic head 22 in the reverse direction. As the tape 12 begins to advance in the reverse direction, the magnetic head 22 is stepped in a lateral direction across the tape by the magnetic head assembly 24, enabling the recording of another track of information on the tape 12. A controller 26 provides data to be written by the magnetic head 22, accepts read data from the magnetic head 22, and provides control information to the head assembly 24. The advancement of the tape 12 continues in forward and reverse directions with the magnetic head 22 stepped laterally across the tape, resulting in multiple parallel recorded tracks. The position of the magnetic head 22 relative to the lengthwise location on the tape 12 is continuously monitored by position sensing means such as an optical tachometer 28.

Very high track densities are obtained through the interaction of a magnetic head like the magnetic head 22 of FIG. 2, which enables efficient azimuth recording, and a servo, to be described in more detail hereinafter. In FIG. 3 there is shown a pattern of recorded tracks 30, 32, 34, and 36 resulting from the use of the tape system 10 of FIG. 1.

According to the principles of the invention, the tracks 30 and 32 include alternate data and servo blocks 38 and 40 respectively. The data 38 in tracks 30 and 32 is written at a first azimuth angle $\theta-$ relative to the lateral direction of the tape 12. The servo information in servo blocks 40 in tracks 30 and 32, for example the servo blocks 122 and 126, is written at a second azimuth angle $\theta+$. The tracks 34 and 36 also include alternate data 38 and servo blocks 40. However, the data 38 in tracks 34 and 36 is written at the second azimuth angle $\theta+$, while the servo information in the servo blocks 40 for these tracks, as shown in servo blocks 124 and 128, is written at the first azimuth angle $\theta-$. The servo blocks 40 are interspersed in the data 38 of the tracks 30, 32, 34, and 36, at locations as determined by tachometer 28 of FIG. 1.

Figure 2:
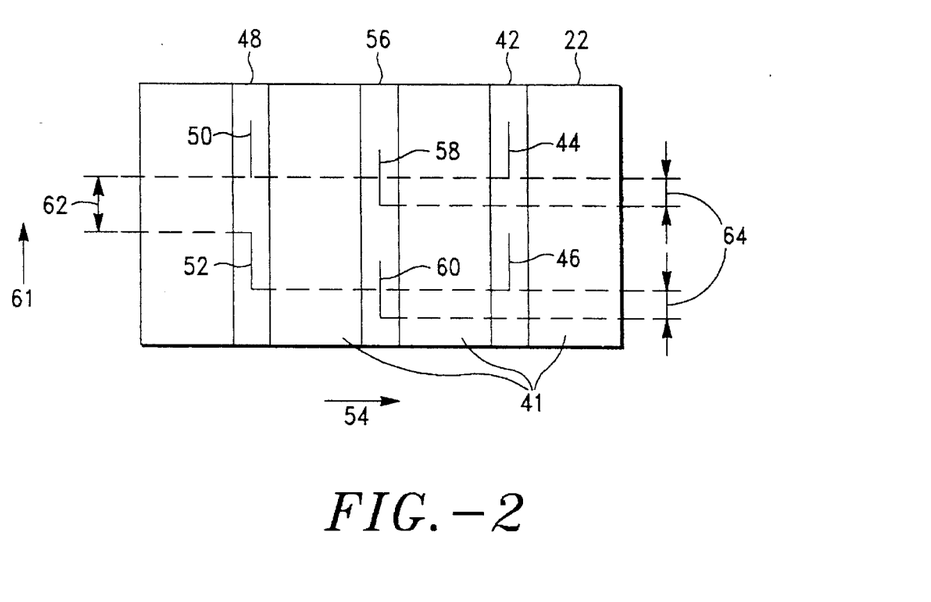
FIG. 2 is a schematic representation of a head gap arrangement of one embodiment of a magnetic head according to the principles of the invention.
Figure 3:
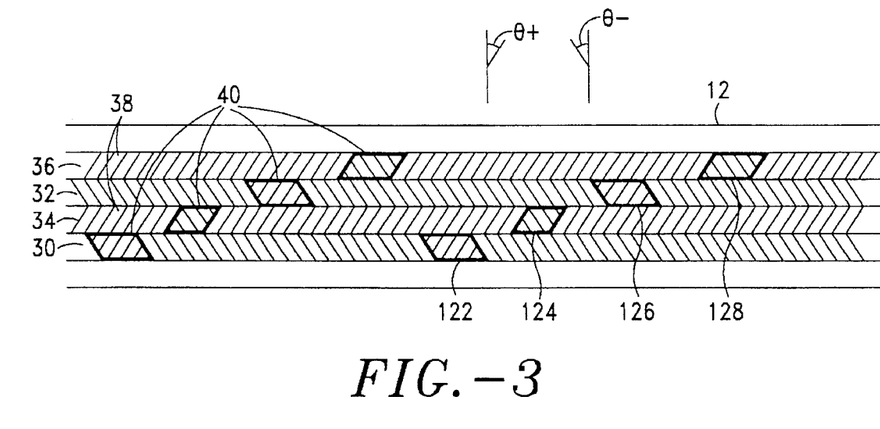
FIG. 3 is an enlarged section of recorded magnetic tape, displaying an azimuth track pattern with embedded servo blocks.

The azimuth recording shown in FIG. 3 is achieved through utilization of a magnetic head like the magnetic head 22 of FIG. 2. Referring to FIG. 2, the surface 41 of the magnetic head 22 contains a first column 42 of write head gaps 44 and 46, a second column 48 of write head gaps 50 and 52 spaced laterally from the first column as shown by the arrow 54, and a third column 56 of read head gaps 58 and 60 situated between the columns 42 and 48. The head gaps of each column are arranged such that their lengths extend in a lengthwise or longitudinal direction generally parallel to the direction of the arrow 61, as shown in FIG. 2. The write head gaps 44 and 46, the write head gaps 50 and 52, and the read head gaps 58 and 60 are arranged such that there is an end-to-end space 62 between them. Further, the corresponding head gaps in the two columns 42 and 48 are placed such that the write head gaps 50 and 44 are generally laterally aligned, and the write head gaps 52 and 46 are generally laterally aligned. The read head gaps 58 and 60 in the third column 56 are offset in a lengthwise direction and distance 64 from the corresponding write head gaps in the other two columns 42 and 48.

According to one embodiment, the length of the write head gaps is approximately 2.5 times the desired track width, while the length of the read head gaps is approximately 1.5 to 2 times the desired track width. With this arrangement, the magnetic head 22 allows azimuth recording of multiple tracks at once according to the invention, including the servo blocks as shown in FIG. 3.

In one embodiment provided for operation with a standard 0.5 inch magnetic tape, laterally spaced apart longitudinal write head gaps of columns 42 and 48 have a length of 2.5 millinches ±0.2 millinches. The longitudinal read head gaps of the third column 56 have a length of 1.5 to 2 millinches ±0.2 millinches, and are located approximately equidistant from the respective head gaps of columns 42 and 48. The offset 64 is approximately 50 millinches. Of course, different dimensions can be employed for operation in different magnetic media environments, the dimensions herein given by reason of example only.

Figure 4:
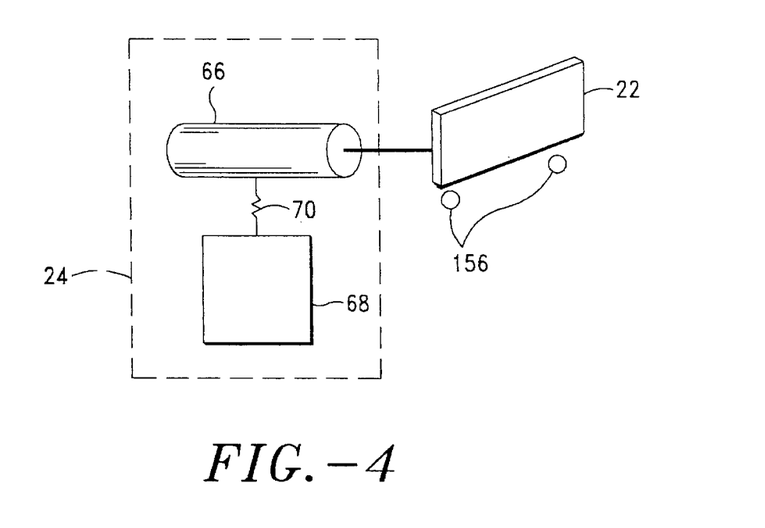
FIG. 4 is a more detailed schematic view of the components of the head assembly of FIG. 1.

Referring to FIGS. 1 and 4, magnetic head 22 is mounted on a head assembly 24, shown in dashed lines in FIG. 4, for lateral and stepped rotatable movement relative to the tape 12. As shown, the magnetic head 22 is mounted for movement about the output shaft of a rotary motor 66. The rotary motor 66, which receives input from the controller 26, serves to rotatably step the magnetic head 22 relative to the tape 12. A stepper motor 68, which also receives input from controller 26, serves to engage an actuator 70, shown as a linear actuator in FIG. 4, for moving the magnetic head 22 in a lateral or widthwise direction across the tape 12. The stepper motor 68 and the linear actuator 70 are used to adjust the track to track position of magnetic head 22. The rotary motor 66 is used for coarse and fine adjustment of the angle of the magnetic head 22 relative to the azimuth angle of a given track.

According to the implementation shown, the stepper motor 68 is capable of 1200 steps/sec at 1.8 degrees/step ±5%. The linear actuator 70 is a lead screw type, advancing 100 microinches per half step. Alternately, the linear actuator 70 can be a implemented as a microstepper. The rotary motor 66 may be implemented either as a gear type DC motor, a stepper motor, a microstepper, or a torque or rotary motor. Because the tape 12 is stopped when the tape system 10 is not in operation, no sample data is available. It is impractical to recalibrate after every stop; therefore, the gear motor is well suited, as the motor is required to hold a preset angular value for a time without a large amount of drift. Alternately, in order to hold rotary position, the rotary motor 66 can be implemented as a rotary actuator with secondary feedback such as an optical sensor. Of course, other methods of stepping and rotating the head 22 may be employed to obtain satisfactory results within the principles of the invention.

Servo

Figure 5:
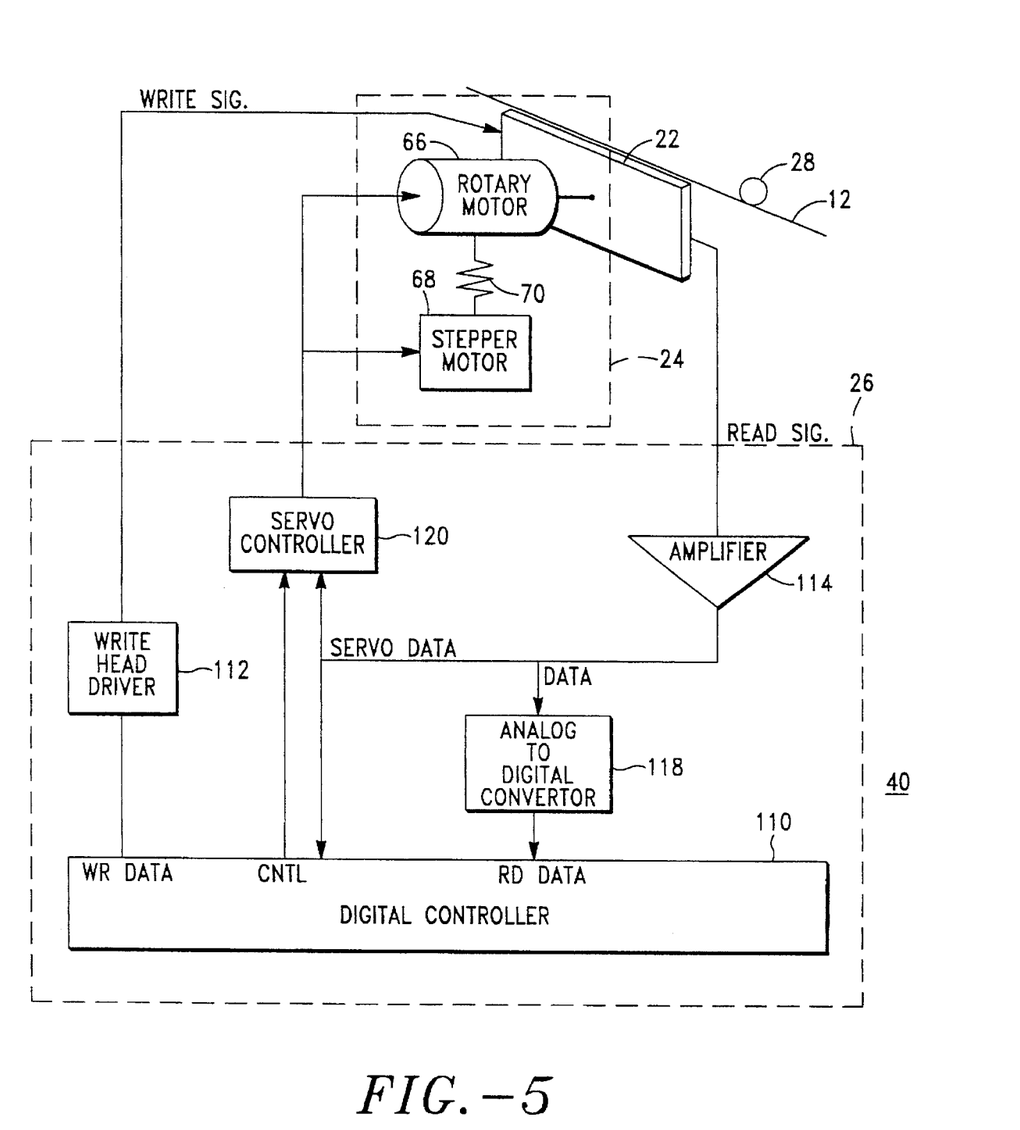
FIG. 5 is a detailed block diagram of the servo for the tape system of FIG. 1.

Referring to FIG. 5, a servo according to the principles of the invention is shown for the tape system 10 of FIG. 1. Controller 26 further includes a digital controller 110, a write head driver 112, an amplifier 114, an analog to digital convertor 118, and a servo controller 120.

The digital controller 110, implemented by means such as a microprocessor, directs the reading and writing of data on the tape 12. To write data, the digital controller 110 outputs digital data to a write head driver 112, which is a digital to analog convertor. The write head driver 112 outputs in turn a write signal to the magnetic head 22. The read signal received by the magnetic head 22 from the tape 12 is amplified by an amplifier 114. The amplified output of the amplifier 114 is in turn coupled to an analog-to-digital convertor 118, the digital output of which is coupled to a read data input of the digital controller 110. The digital controller 110 processes the data and forwards it to a requesting host, such as a mainframe computer system or server. The amplified output of the amplifier 114 is also coupled to a servo controller 120, which recognizes servo information and senses its signal level. Control information, representing such factors as write/read condition and tape direction, is also input to the servo controller 120 from the digital controller 110. Servo controller 120 interprets the servo information from the amplifier 114 and the control information inputs from the digital controller 110, and generates output control signals which are coupled to the rotary motor 66 and the stepper motor 68 of the head assembly 24 for movement of the magnetic head 22 relative to the tape 12.

The servo system can be used to correct for two different sources of error in head positioning during writing: unwanted lateral motion of the write head during writing, and lateral tape motion (LTM). The servo system can also be used to correct for errors in head positioning during reading.

Referring back to FIG. 3, as the magnetic head 22 writes data along a track, intervals of servo information 122, 124, 126, or 128 are left amidst the data. During reading or recording of a given track, the read head is not subject to interference or cross talk due to the data recorded in the previously recorded adjacent track because the data is at a different azimuth angle and thus its signal strength is greatly attenuated. The servo information in the previously recorded adjacent track, however, is clearly discernible by the read head, since it is recorded at the same azimuth angle to which the read head is now positioned. The servo controller 120 uses the servo information in the adjacent tracks to drive the stepper motor 68 and the rotary motor 66 of the head assembly 24 in order to control the position of the magnetic head 22 for writing and reading tracks.

Figure 6:
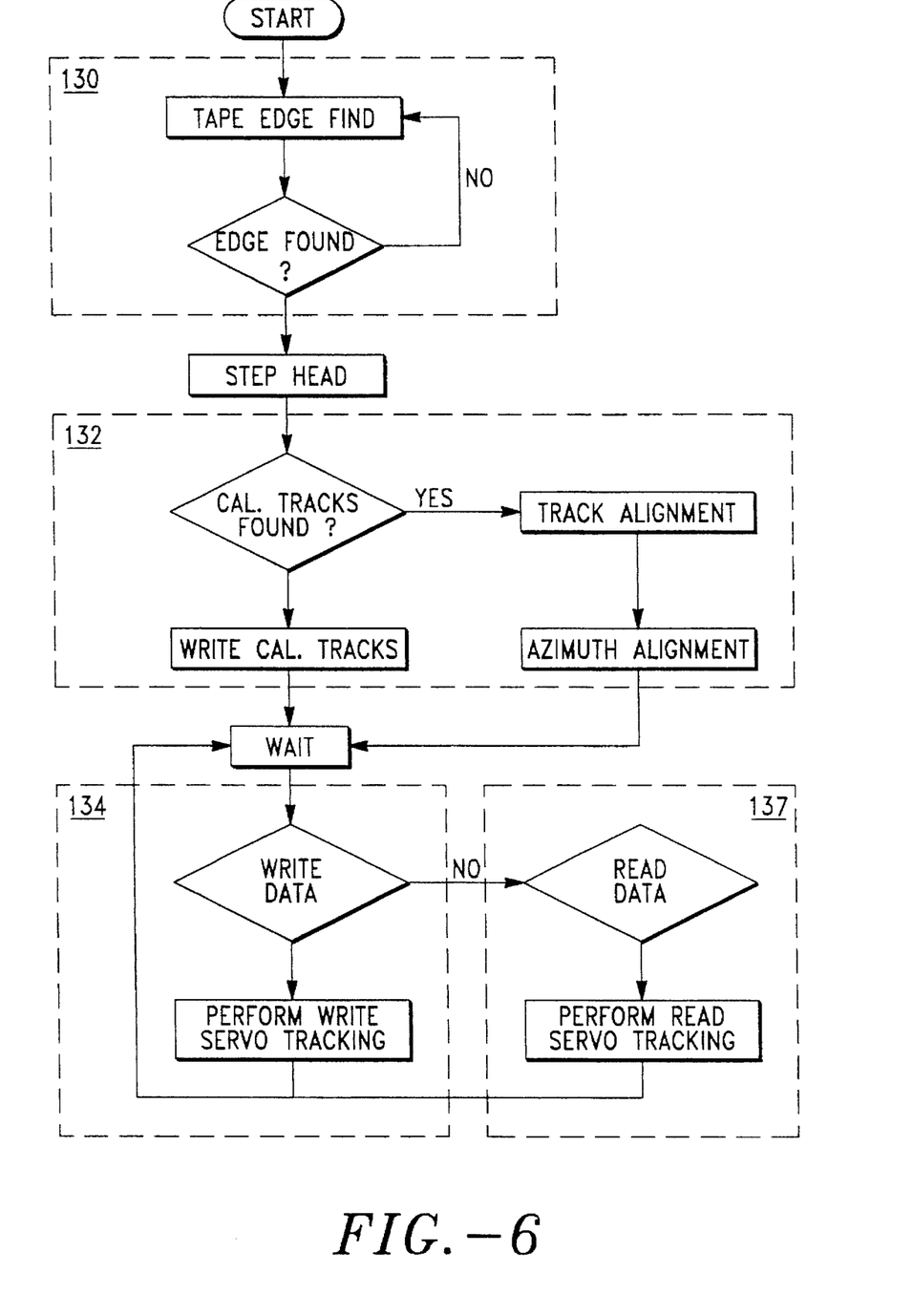
FIG. 6 is a general flow chart of the operation of the servo according to the principles of the invention.

As shown in the flowchart of FIG. 6, the servo method consists of calibration, write, and read operations, each of which is further described in detail.

Referring to block 130 of FIG. 6, calibration begins with a tape edge find operation. The magnetic head 22 is initially positioned off the edge of the tape 12. It is stepped toward the tape until it can successfully reproduce, beyond a pre-determined noise threshold, data it attempts to write.

Figure 9:
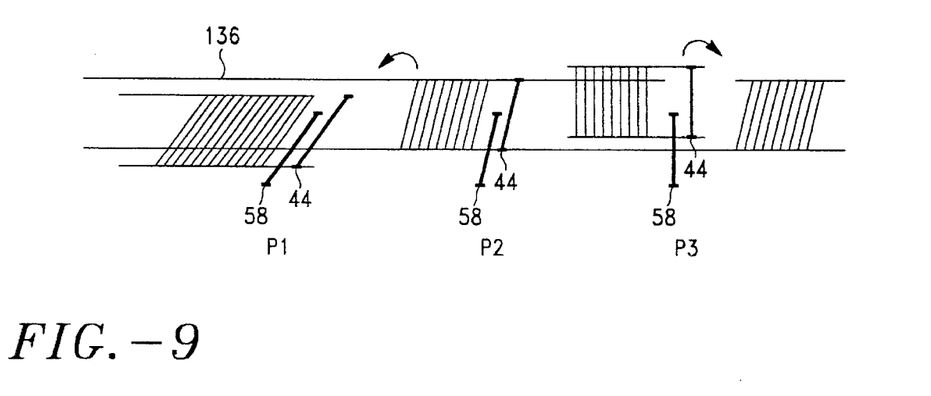
FIG. 9 is a schematic representation of the head adjustments made according to a type of write servo of the present invention.

After the edge of the tape 12 has been found, the tape 12 must be calibrated, as shown in block 132 of FIG. 9. The servo controller 120 directs the magnetic head 22 to look for calibration tracks which will exist if the tape has been written. The magnetic head 22 is stepped a pre-determined distance from the edge of the tape. If the tape is blank, calibration tracks will not be found, therefore, calibration tracks will be written in the calibration area at the beginning of the tape. These calibration tracks are used for lateral alignment with track 0 (the first track written on the tape) and for azimuth alignment which may be necessary between tapes and heads of different systems.

Write Servo

Figure 7A:
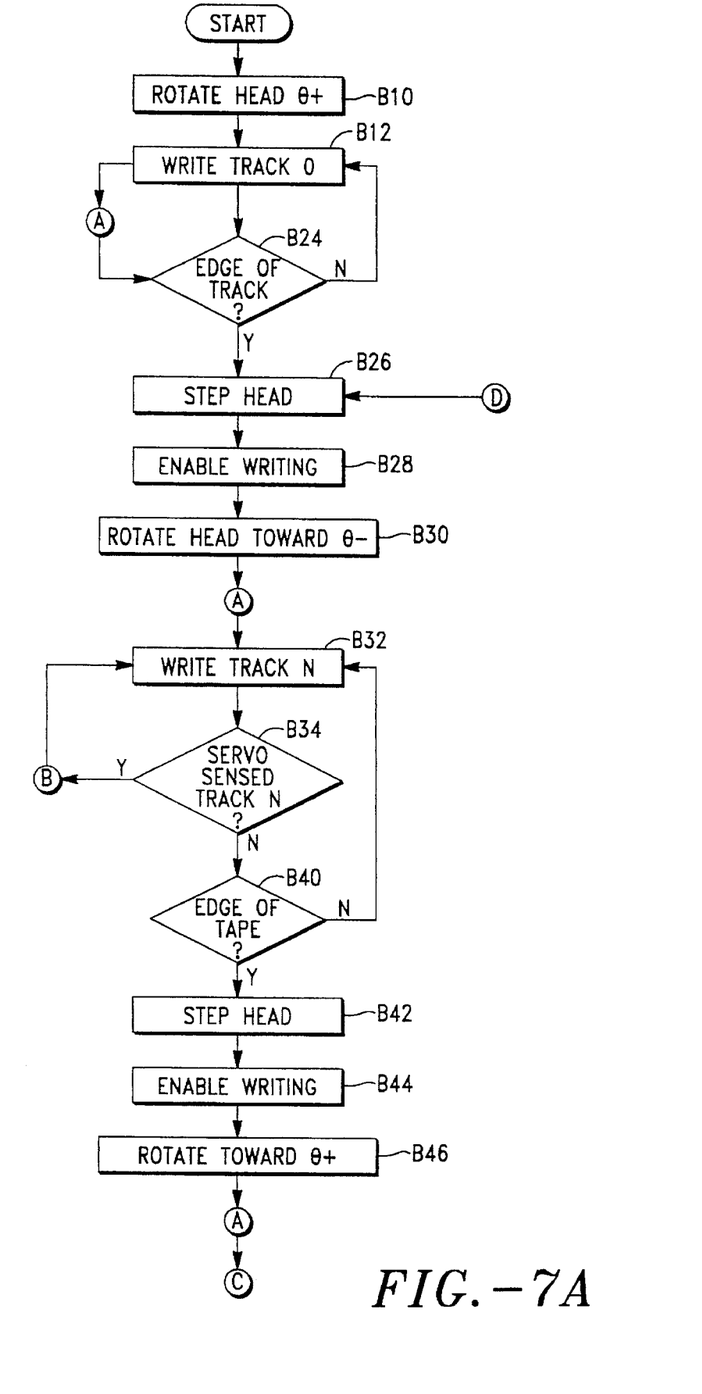
FIG. 7 is a detailed flow chart of the write servo block of FIG. 6, showing the operation of the write servo according to the principles of the invention.
Figure 7B:
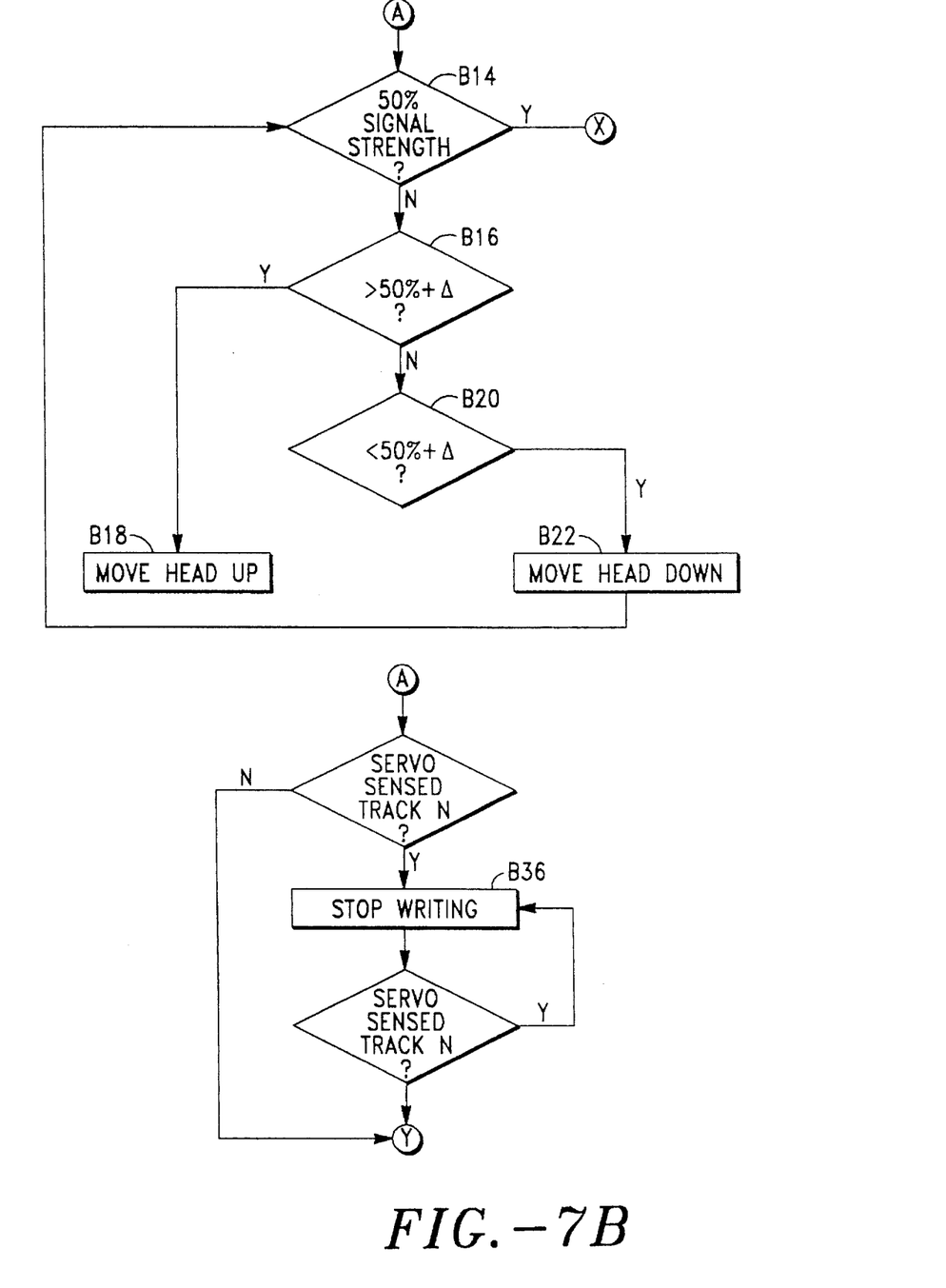
Figure 8:
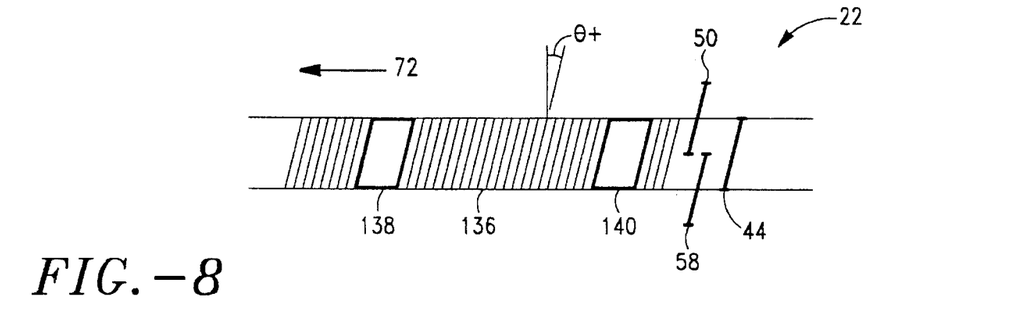
FIG. 8 is a schematic representation of a truck segment showing the process of writing an initial track according to the principles of the invention.
Figure 10:
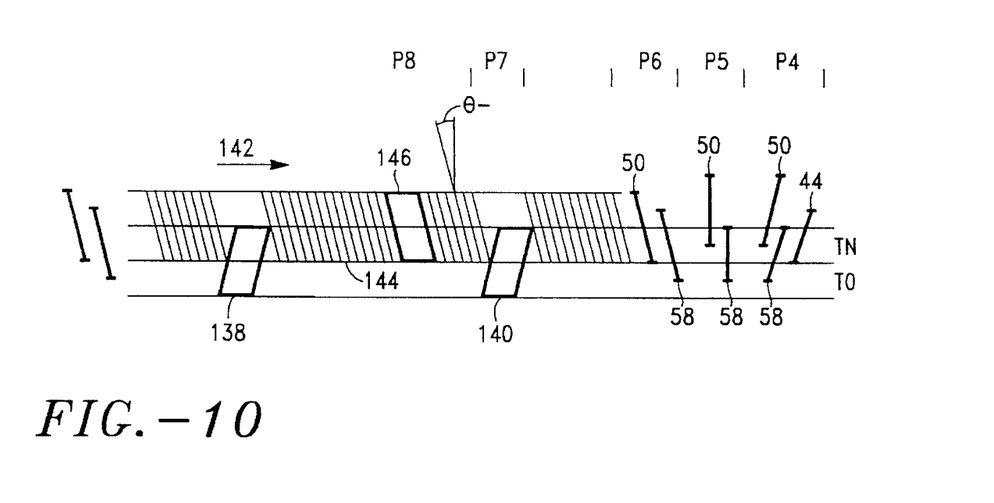
FIG. 10 is a schematic representation of the process of writing a second track at a different azimuth angle according to the principles of the invention.

After the tape system 10 has been calibrated, the tape 12 may be written. The write servo of the invention results in significant track density increases. FIG. 7, a detailed representation of block 134 of FIG. 6, presents a flow diagram of the operation of the write servo. FIGS. 8–10 are views of the positioning of the read head gap 58 and write head gaps 44 and 50 of the magnetic head 22 relative to the tracks being written. For ease of description, the magnetic head 22 is shown to have only one head per column, though it is understood that the servo according to the invention functions in the same manner with the use of a multi-track head.

Referring to FIGS. 7 and 8, after the track 0 location is determined through the calibration method previously described, a first data track 136 is written open loop, under no servo control, at this lateral position. The magnetic head 22 is rotated to a positive azimuth angle +θ (block B10) against a preset position 156 (shown in FIG. 4), bringing the read head gap 58 and write head gap 44 into general azimuth alignment, and the tape is driven past the magnetic head in the forward direction 72. Track 136 is written to contain intervals of data and intervals of servo tracking information 138 and 140 at the positive azimuth angle θ+ (block B12). The servo intervals, or blocks, are inserted amidst the track 136 data at pre-determined intervals as indicated by the tachometer 28. In FIG. 8, a section of track 136 is shown.

The servo blocks must be placed on the tape at intervals depending on the speed of linear advancement of the tape and the maximum expected frequency of the lateral tape motion, such that the sampling rate provided by the servo blocks is at least twice the lateral tape motion frequency; therefore, the servo block separation is at most V/2F, where V is tape speed and F is maximum lateral tape motion frequency. In a typical system, if the lateral tape motion frequency is on the order of 2 hz and the tape speed is 100 in/s, the sampling frequency provided by the servo blocks must be at least 4 hz, making the maximum separation of the servo blocks 25 inches.

During the writing of any track including track 136, the read head 58 read checks the data written by the write head that is enabled. The signal strength of the data read can be used by the servo controller 120 (FIG. 5) to determine the position of the write head relative to the read head 58, and thus the servo controller 120 can detect when the write head has moved out of position. For example, referring to FIG. 9, when the write head 44 is properly positioned, half of the read head 58 will overlap the write head 44 as seen at P2, and the signal strength of the data read as evaluated by the servo controller 120 will be within some differential Δ of 50%. As the write head gap 44 writes track 136 at a positive azimuth angle θ+, it is possible for the head 22 to rotate out of position such that the write head gap 44 and read head gap 58 are positioned as shown at P1. In this case, the signal strength of the data being read by the read head 58 is greater than 50%, since more of the read head gap overlaps the write head gap. The servo controller 120 compares the signal strength received to 50%±Δ, the Δ chosen being application specific (block B14). In this case, if the signal strength is greater than 50%+Δ (block B16), the servo controller 120 will direct that the head 22 be rotated in a counterclockwise direction via rotary motor 66 (FIG. 4) such that the write head gap 44 moves up relative to the read head 58 (block B18). At position P2, the write and read gaps 44 and 58 are shown as being properly positioned. Half of the read gap 58 overlaps the write gap 44, so the signal strength of the data will be evaluated as within a Δ of 50%. At position P3, the head 22 is shown to be rotated out of position such that less than half of the read gap 58 overlaps the write gap 44. In this case, if the signal strength of the data being written by the write gap 44 is evaluated to be less than 50%−Δ (block B20), the servo controller 120 will direct that the head 22 be rotated in a clockwise direction via rotary motor 66 such that the write head gap 44 moves down relative to the read gap 58 (block B22). This servo method can be used during the recording of any track to adjust the position of the write head during writing.

Referring now to FIGS. 7 and 10, When the end of the tape is reached (FIG. 7 block 24), the direction of travel of the tape 12 is reversed to advance in the direction indicated by the arrow 142. The stepper motor 68 activates the linear actuator 70 which moves the magnetic head 22 laterally over the tape 12 to the next track position to be written (block B26). The position at which the next track is to be written is chosen such that a portion of the previously written track will be overwritten. In particular, the next track 144 is positioned such that approximately one-half the width of the previously written track 136 will be overwritten. (See position P4 of FIG. 10). The write head gap 50 is then enabled to write a data pattern (block B28). As writing begins, the motor 52 rotatably steps the magnetic head 22 toward a negative position, bringing the write head gap 50 towards the center of the previously recorded track 136 (block B30, P5). When the read head gap 58 receives a signal strength from the data being written by the write head gap that is within 50%±Δ of a full track signal strength (blocks B14, B16, B18, B20, B22, and P6), the write head gap 50 is presumably correctly positioned, and writing of data in track 144 at an azimuth angle θ− commences (block B32). Servo blocks like block 146 are again written at positions as determined by the tachometer 28 at the azimuth angle θ−.

During the writing of the track 144, the controller 110 keeps track of the locations of servo blocks within the previously recorded track 136, as indicated by the tachometer 28. When the tape 12 advances to a position coinciding with a position at which a servo block, like block 140, was written in track 136 (block 34), the controller 110 signals the write head driver 112 to stop writing (block B36) in the present track for the length of the servo block (block B38, P7). Writing is thereafter resumed (block B32, P8). The resulting track 144 is thus left with servo information 138 and 140 at an azimuth angle θ+ embedded within data at an azimuth angle of θ−.

Figures 11, 11A, 11B:
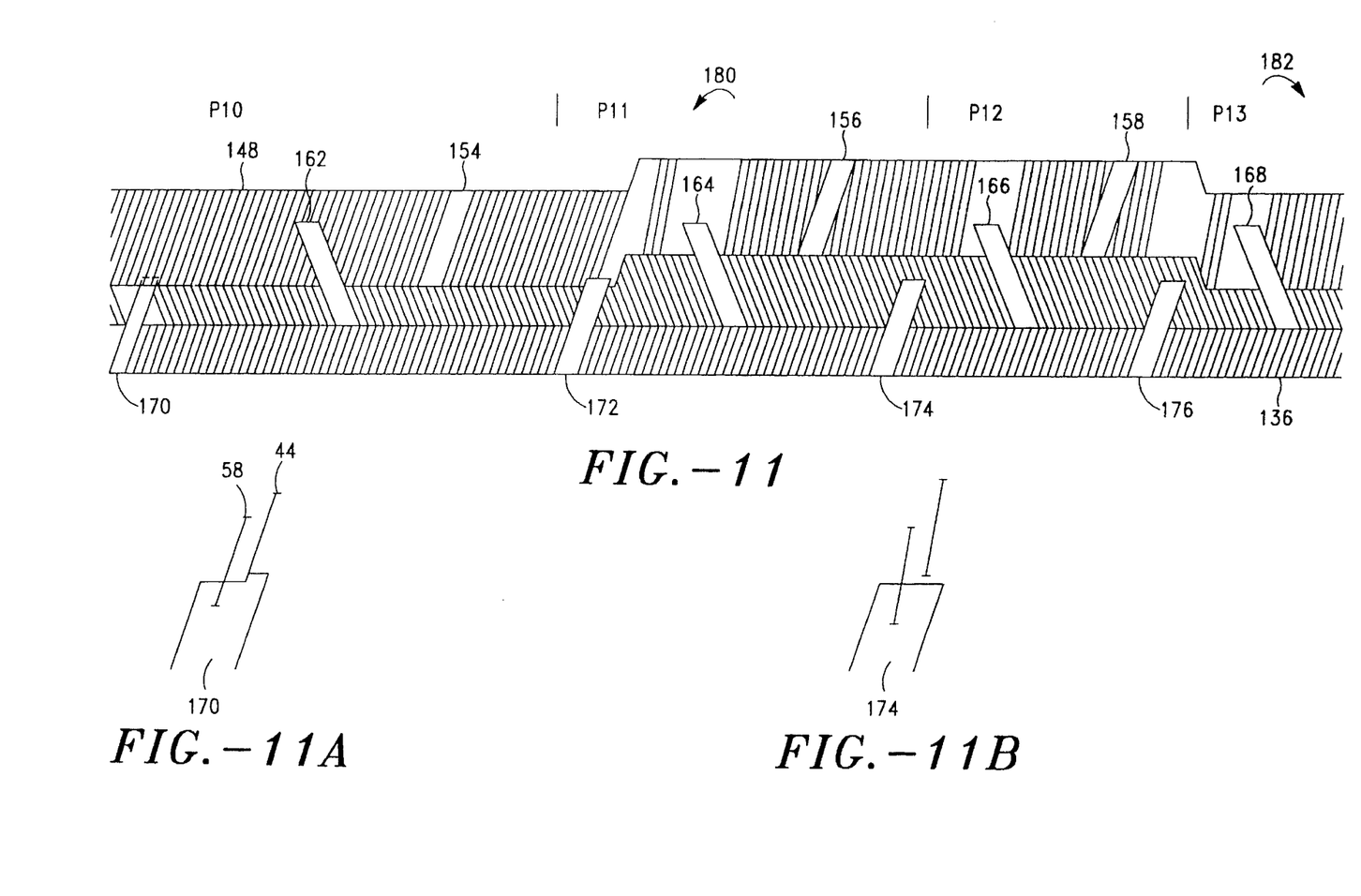
FIG. 11 is a schematic representation of a tape segment showing the successive angular positioning of the magnetic head of FIG. 2 during operation of the write servo.
FIGS. 11A and 11B are enlarged schematic views of servo blocks of the FIG. 11 schematic with exemplary head positions superimposed thereon during the write servo operation.

Referring to FIGS. 7 and 11, When the track 144 writing is complete and the end of the tape 12 is reached (B40), the magnetic head 22 is once again stepped upward a distance of about one-half the width of the previously recorded track 144 (B42). The write head gap 44 is enabled (B44), and the head 22 is rotated toward the positive azimuth angle θ+ (B46). As was explained for the previous track 144, when the read head gap 58 receives a signal from the write head gap 44 at approximately 50% of a full track signal (B14–B22), the write head gap 44 is presumably correctly positioned, and writing of data at an azimuth angle θ+ commences (B48). Again, servo blocks like block 154, 156, and 158 are inserted amidst the track 148 data at predetermined intervals as indicated by tachometer 28 at the azimuth angle θ+, while writing is periodically interrupted to leave the servo information recorded in the previously written track 144 at the opposite azimuth angle θ−, like servo blocks 162, 164, 166, and 168, embedded at intervals within the data of the track 148.

FIG. 11 is not drawn to scale. For clarity of description, the servo blocks are drawn closer together than they would in reality reside; also, head 22 movements are exaggerated.

The servo blocks 170, 172, 174, and 176 which were written during writing of the track 136 and which are embedded within the track 144 can now be used to correct for the effects of lateral tape motion (LTM) during writing according to a second write servo method. In general, as data (and servo blocks) are written in track 148, the tape 12 is monitored for the presence of servo blocks like block 170 written during the writing of track 136 and now embedded in track 144. For purposes of description, alternate servo blocks are referred to as "even" and "odd". Here, servo blocks 170 and 174 are arbitrarily designated as "even" blocks, while servo blocks 172 and 176 are "odd" blocks. The positions of the servo blocks may be provided by the tachometer 28. Alternately, the positions of the servo blocks can be determined dynamically by the read head gap 58. This is possible because the blocks being monitored were written at the same azimuth angle at which the read gap 58 is now positioned.

The write servo operates as follows. When an even servo block embedded in track 144 like 170 is sensed (B60), the track 148 write proceeds normally over the even servo block 170 (P10) and the read head gap 58 reproduces the even servo block information from track 144. The amplitude of the servo information received is stored within the servo controller 120.

Writing as previously described continues: that is, writing is stopped when servo information like servo block 162 is encountered in the previously written track 144 in order to leave servo blocks embedded in the present track 148 (B50, B36, B38), and servo blocks like servo block 154 and 156 are written in track 148.

When the odd servo block 172 (B64, P11) is sensed, writing is interrupted (B66) while the read head gap 58 again reproduces the servo information (B68). The difference in amplitude Σ between the reproduction of the even servo block 170 at position P10, during which writing was enabled, and the reproduction of the odd servo block 72 at position P11, during which writing was disabled, is calculated by means such as a differential amplifier in the servo controller 120 (B72).

This difference in amplitude Σ is compared to a reference differential K by means such as a voltage comparator in servo controller 120. Reference differential K indicates a pre-determined lateral relationship between tracks 144 and 148, thereby representing the desirable range for which the write head gap 44 may deviate from the edge of the track 144 while writing the track 148. When Σ is less than the lower limit of the permitted range K, the even and odd servo 172 block 138 and 140 amplitudes are approximately equal, indicating that the write head gap 44 is not sufficiently close to track 136, and thus is positioned somewhere above track 144. When Σ is greater than the upper limit of the range K, the write head gap 44 has written over the even servo block 170, decreasing its read amplitude relative to the reference odd servo block 172. Such a comparison indicates that write head gap 44 is positioned too far towards track 144. When Σ is within the range K, the write head gap 44 is positioned toward even servo block 138 far enough to indicate that track 148 is being written at the predetermined lateral relationship to track 144. In FIG. 11 at position P12, this relationship is shown to be contiguous.

Referring back to the example of FIG. 11, as the magnetic head 22 passes over the even servo block 170 at position P10 (B60), both the read gap 58 and the write gap 44 overlap track 144. Data is written as usual. The effect is shown in FIG. 11A: the servo block is written over by the write head, thus resulting in a relatively low signal amplitude received by the read head 58 and stored by the servo controller 120 (B62) . Writing of data and servo information continues normally (B63) until the magnetic head 22 reaches the odd servo block 172 at position P11 (B64). Writing is then disabled (B66). Since the write head gap 44 does not write over the servo information 172, the read head gap 58 reproduces servo information which has a higher amplitude than the information which was received from servo block 170. The servo controller stores this amplitude (B68), and writing resumes (B70) . The servo controller 120 calculates the difference Σ between the amplitude of this reference odd servo block 172 and the previous even servo block 170 (B72). In the case shown, the difference in amplitude Σ is evaluated to be greater than the permitted range K (B74), indicating that the magnetic head 22 is positioned such that write head gap 44 is positioned too far toward track 144. As a result, the servo controller 120 directs rotation of the magnetic head 22 in the direction represented by the arc 180, moving write head gap farther from track 144 (B76) , and writing of data and servo information occurs as previously described (B48).

When the next even servo block 174 is reached at position P12 (B60), the write head gap 44 continues to write. However, as seen in FIG. 11B, the write head is writing at a position above the servo block 174 and thus does not write over the servo information. The read head reproduces the servo information and the servo controller 120 stores its amplitude (B62). Writing continues (B63). When the next odd servo block 176 passes under the magnetic head 22 (B64) at position P13, writing is discontinued (B66), and the read head again reproduces the servo information, the amplitude of which is stored by the servo controller 120 (B68). This time, since the write gap 44 wrote over neither of the servo blocks 174 or 176, the difference in amplitude Σ of these even and odd servo block reads is evaluated by the servo controller 120 to be substantially 0 (B72), and therefore less than the reference differential K (B78). The head 22 is therefore rotated at position in the direction indicated by the arc 182 so that the write head gap 44 is moved closer to the track 144 (B80).

The write gap 44 is now ideally positioned such that it slightly overlaps track 144, such that track 148 and track 144 are in a contiguous relationship. The comparison in amplitudes of the next two servo blocks encountered (not shown) will be within the desired range K, and thus the write gap 44 will not be moved.

This write servo will continually correct the position of the write head gap 44 relative to the edge of track 144 in spite of any perturbations in the direction of track 144 due to lateral tape motion which may have occurred when track 144 was written. Any lateral tape motion which occurs during the writing of track 148 will also invoke the same write servo for correction.

When the end of the tape is reached again, the head is rotated toward the opposite azimuth angle θ–, and the process is repeated. This process continues until the entire tape is written. With this servo, the first two tracks written are the only two tracks which are subject to random variation in lateral direction due to lateral tape motion. All other tracks are written under servo control so as to be contiguous to the previous track written. This servo mechanism eliminates the need for guard bands between tracks or unnecessarily wide tracks to compensate for lateral tape motion. Because lateral tape motion affects writing only during the recording of tracks 0 and 1, its effects may now be ignored when determining minimum possible track width. Therefore, this write servo method allows much greater track densities than previously possible.

A number of variations on this write servo are possible. Though the previous description referred to the rotary motor 66 as the means for adjusting the lateral position of the write head gap, it may also be reasonable to employ the stepping motor 54 and linear actuator 70 for this purpose; particularly at the beginning of a track write, where more substantial lateral corrections may be needed.

Also, though the means for monitoring the tape 12 for servo blocks is presented herein as a tachometer, the reproduction of servo data itself may be sufficient as an indication that servo is present.

In addition, it is conceivable to perform the comparison based on amplitudes received from a single servo block. For instance, when the tachometer indicates that a servo block is present, its amplitude may be read twice: once with the write head gap disabled, and once with the write head gap enabled. The comparison is then performed based on the two amplitudes received.

Furthermore, the block diagram of FIG. 7 shows two different servos operating concurrently; the servo block tracking method, and the method whereby the read head checks for 50% signal strength in order to track movement of the write head. It should be understood that once the servo block tracking method is invoked, the other method is not necessary, since the servo block tracking method will obviously correct for both types of positional error.

Read Servo

Figure 12:
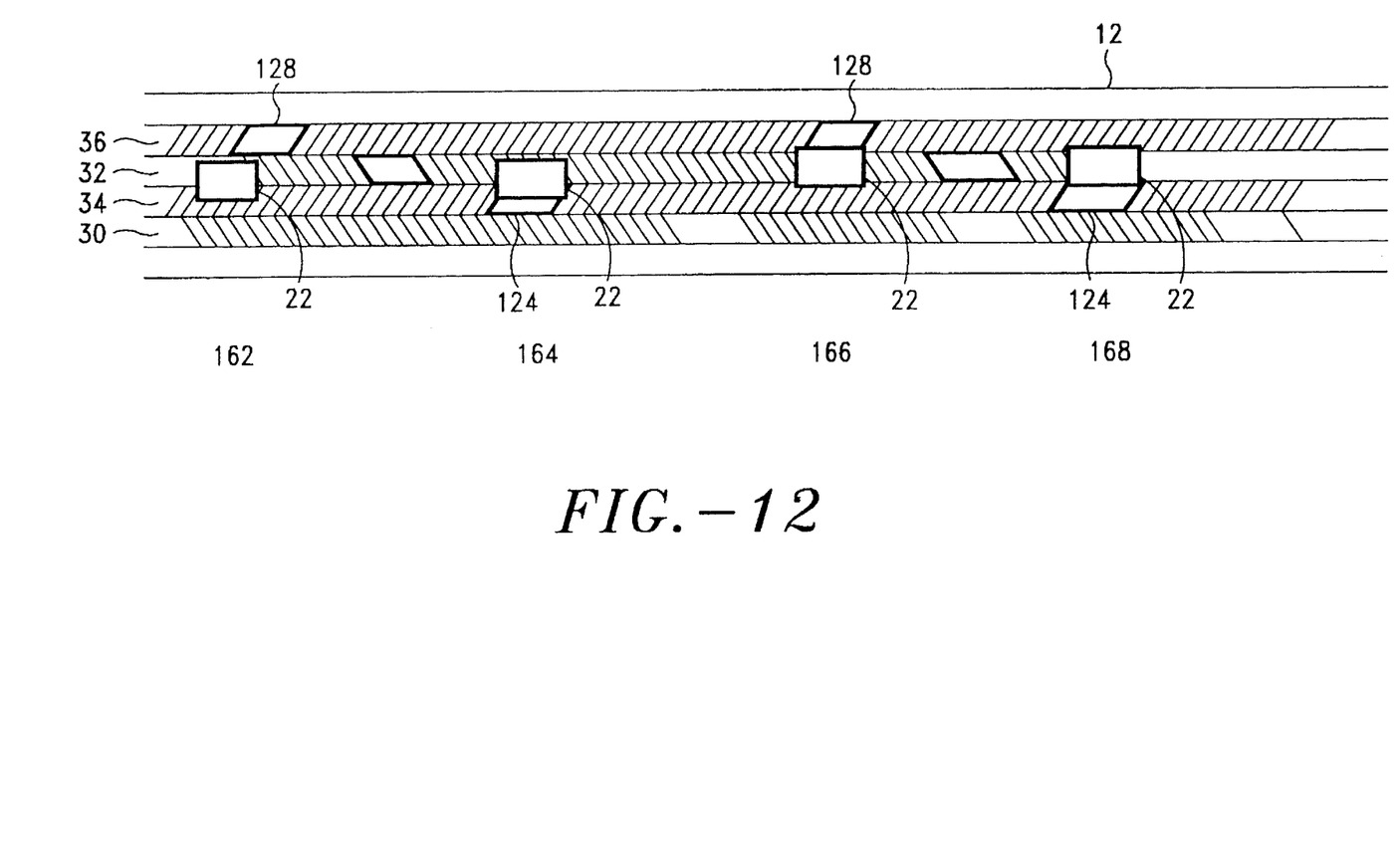
FIG. 12 is a schematic representation of the lateral positioning of the magnetic head of FIG. 2 during operation of the read servo in accordance with the principles of the invention.

The servo of the invention also corrects the lateral positioning of the magnetic head 22 during reading. The read servo, block 137 of the flow chart of FIG. 6, and further detailed in the flow chart of FIG. 13, uses servo blocks aligned in a staggered fashion relative to each other as shown for example in FIG. 3. FIG. 3 is a schematic representation of a portion of tape which displays the azimuth recording pattern and the positioning of the servo blocks. Tracks 30 and 32 are recorded in the forward direction, while tracks 34 and 36 are recorded in the reverse direction. Tracks 30, 32, 34, and 36 contain alternate data and servo information. Servo blocks are labeled 122, 124, 126, and 128 relative to their positions on the tape. FIG. 12 is an expanded view of tracks 36, 32, and 34 of FIG. 3. The positioning of magnetic head 22 is shown for successive tape positions P62, P64, P66, and P68.

Figure 13:
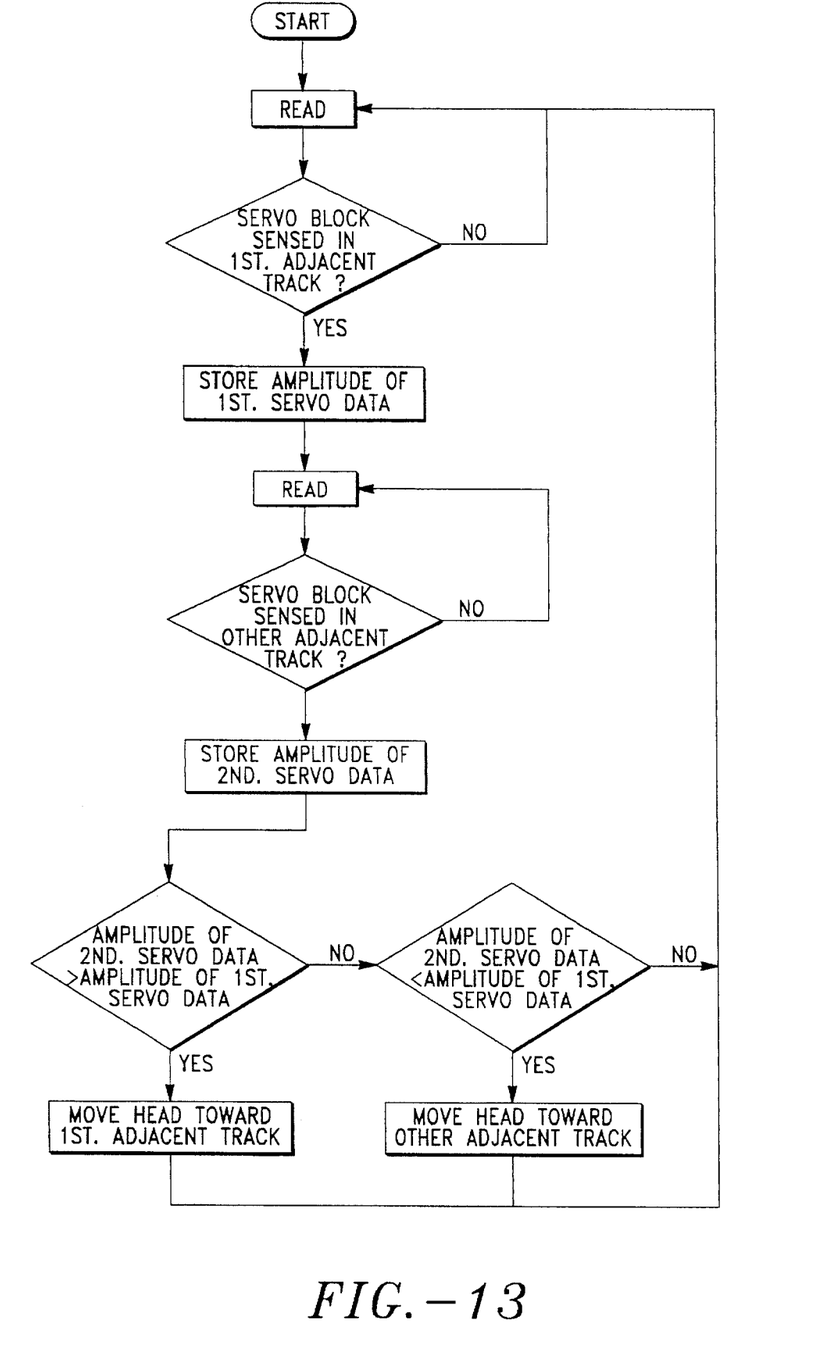
FIG. 13 is a detailed flow chart of the read servo block of FIG. 6, showing the operation of the read servo according to the principles of the invention.

The operation of the read servo will be described by example while referring to FIGS. 6, 12, and 13. On the left side of FIG. 12, at position P62 the magnetic head 22 is positioned to read track 32, but is misaligned toward track 34. As the tape advances in a forward direction across the magnetic head 22 past position P62, the read head gap 58 will reproduce a small signal from servo block 128 of track 36 at position P62. A value representing the signal strength of the received servo signal will be stored in servo controller 120. According to the principles of the invention, azimuth misalignment of the read head gap 58 to the data in tracks 36 and 34 prevent excessive crosstalk noise during reading; however, the servo signal from either adjacent track is azimuth aligned with the read head and thus will be received. As the tape continues to advance, magnetic head 22 will cross a servo block 124 of track 34 at position P64. The signal reproduced from this servo block will be of a higher amplitude than the signal previously received from servo block 128 of track 36, and will also be stored in servo controller 120. The servo controller 120, using means such as a voltage comparator, will compare the signal strengths of the servo signals received from servo blocks 124 and 128 to adjust the lateral position of the head over track 32. If the signal strength received from a servo block 124 is greater than the signal strength received from a servo block 128, the servo controller 120 will drive stepper motor 68 to move magnetic head 22 towards the adjacent track 36 containing servo blocks 128. Likewise, if the signal strength received from a servo block 128 is greater than the signal strength received from a servo block 124, the servo controller 120 will drive stepper motor 68 to move magnetic head 22 towards the other adjacent track 34 containing servo blocks 124. Magnetic head 22 is centered over track 32 when successive servo block reads result in equal signal amplitudes, as shown at positions P66 and P68.

Alternatively, referring to FIG. 3, the particular servo block pattern shown is not necessary to the operation of the read servo. Any pattern that allows servo to be read from adjacent tracks may be functional. For instance, if the servo blocks 126 and 128 of FIG. 3 are laterally aligned with the servo blocks 122 and 124 respectively, the read servo would be functional, though subject to providing ambiguous results when the magnetic head 22 is misaligned exactly between two tracks.

In addition to lateral adjustment of read head gap 58, the read servo also adjusts the azimuth position of read head gap 58 relative to the azimuth angle of the track data. To adjust the azimuth position of read gap 58, magnetic head 22 is rotated by rotary motor 66 (shown in FIG. 4) in both the positive and negative directions while data is being read. The angular position in which maximum data amplitude is obtained indicates the optimal azimuth position of read head gap 58.

It is apparent that, within the scope of the invention, modifications and different arrangements may be made other than as herein disclosed. The present disclosure is merely illustrative, the invention comprehending all variations thereof.

What is claimed is:

1. A magnetic tape storage medium having data and servo information recorded thereon, comprising:

a first linear data track written on the medium including alternate data and servo information along the first linear data track, the data information and first fields of the servo information being written at a first azimuth angle at the time the first linear data track was written, and second fields of the servo information interleaved with the first fields and embedded in the first linear data track and written at a second azimuth angle different from the first azimuth angle at a time of writing of servo information in an adjacent track at the second azimuth angle before writing of the data and first servo fields along the first linear data track.

2. The magnetic tape storage medium of claim 1 further comprising:

a second linear data track adjacent to the first linear data track and including alternate data and servo information along the second linear data track, the data and third fields of the servo information on the second linear data track written at the second azimuth angle and and fourth fields of the servo information on the second linear data track as remnants of the first fields of the servo information of the first linear data track written at the first azimuth angle during writing of the first linear data track.

3. A magnetic tape storage medium on which multiple data tracks are linearly recorded comprising:

a first data track including alternate data and servo information, the data and first fields of servo information written at a first azimuth angle at the time the first data track was written and second fields of the servo information embedded in the first data track, interleaved with the first fields of servo information, and written at a second azimuth angle at a time of writing of an adjacent track at the second azimuth angle before writing of the data in the first data track, the first data track overwriting a lateral portion of the adjacent track except at the second fields of the servo information; and a second data track adjacent to the first data track and including alternate data and servo information, the data and third fields of servo information written in the second data track at the second azimuth angle and first fields of the servo information written at the first azimuth angle as remnants of writing of the first track and embedded within the second data track and interleaved with the third fields of servo information, the first data track being written before the second data track, the second data track overwriting a lateral portion of the first data track except at the first fields of the servo information.

4. A method of linear recording on a magnetic medium comprising the steps of:

writing a track at a first lateral location on the magnetic medium, the track being written to include alternate data and servo information at a first azimuth angle, said track having a width;

writing a track at a second lateral location on the magnetic medium, the track being written to include alternate data and servo information at a second azimuth angle, said second lateral location being spaced from said first lateral location such that a portion of the width of the first track is overwritten by the writing of the second track; and interrupting the writing of data and servo information in the second track on the magnetic medium at a position coinciding with the position of servo information in the first track so that servo information written in the first track is left embedded as servo information written at the first azimuth angle and interleaved with the servo information written at the second azimuth angle in the second track.

5. The method of claim 4 wherein the step of writing a track at a second lateral location writes a track such that said second lateral location is spaced from said first lateral location such that one half of the first track is overwritten by the writing of the second track.

6. A method of linear recording on a magnetic medium comprising:

writing information in a first track lengthwise on the magnetic medium, the first track being written to include alternate data and first servo information, the data and first servo information being written at a first azimuth angle;

writing information in a second track following completion of the first track, the second track being written to include alternate data and second servo information, and in adjacent lateral relationship to the first track, the data and the second servo information in the second track being written at the second azimuth angle;

monitoring the first track during writing of the second track for the presence of servo information;

interrupting writing of data and second servo information in the second track on the magnetic medium at a position coinciding with the position of the first servo information so that the first servo information becomes embedded as first servo information in the second track;

writing information in a third track in adjacent lateral relationship with the second track following completion of the second track, the third track being written to include alternate data and third servo information, the data and the third servo information in the third track being written at the first azimuth angle;

interrupting the writing of information in the third track on the magnetic medium at a position coinciding with the position of second servo information written in the second track so that second servo information becomes embedded as second servo information in the third track;

interrupting the writing of information in the third track on the magnetic medium at a position coinciding with the position of a first occurring one of first servo information embedded in the second track;

measuring and storing amplitude of the first one of the first servo information;

resume writing information in the third track;

interrupting the writing of information in the third track on the magnetic medium at a position coinciding with the position of a subsequent one of the first servo information in the second track;

measuring and storing amplitude of the subsequent one of first servo information in the second track;

supplying a reference differential indicating a predetermined lateral relationship between tracks;

comparing a difference between the stored amplitude measurements of the two servo information with the reference differential; and adjusting the lateral position of writing in the third track in response to the comparison when said comparison falls outside the reference differential to bring the two tracks into the predetermined lateral relationship.

7. The method of claim 6 wherein the step of adjusting adjusts the lateral position of writing to bring the third track into a predetermined laterally abutting relationship with the second track.

8. Apparatus for linear recording on a magnetic medium comprising:

means for writing a track at a first lateral location on the magnetic medium, the track being written to include alternate data and servo information at a first azimuth angle, said track having a width;

means for writing a track at a second lateral location on the magnetic medium, the track being written to include alternate data and servo information at a second azimuth angle, said second lateral location being spaced from said first lateral location such that a portion of the first track is overwritten by the writing of the second track; and means for interrupting the writing of data and servo information in the second track on the magnetic medium at a position coinciding with the position of servo information in the first track so that servo information written in the first track, at the first azimuth angle, is left embedded in the second track.

9. The apparatus of claim 8 wherein the means for writing a track at a second lateral location on the magnetic medium writes the track such that the second lateral location is spaced from said first lateral location such that half the first track is overwritten by the writing of the second track.

10. Apparatus for linear recording on a magnetic medium comprising:

means for writing information in a first track lengthwise on the magnetic medium, the first track being written to include alternate data and first servo information, the data and first servo information being written at a first azimuth angle;

means for writing information in a second track upon completion of the first track, the second track being written to include alternate data and second servo information, and in adjacent lateral relationship to the first track, the data and the second servo information in the second track being written at the second azimuth angle;

means for monitoring the first track during writing of the second track for the presence of servo information means for interrupting the writing of data and servo information in the second track on the magnetic medium at a position coinciding with the position of servo information in the first track so that first servo information written in the first track is left embedded in the second track;

means for writing information in a third track upon completion of the second track, the third track being written in adjacent lateral relationship to the second track and to include alternate data and third servo information;

means for interrupting the writing of information in the third track on the magnetic medium at a position coinciding with the position of second servo information written in the second track so that second servo information written in the second track is left embedded in the third track;

means for interrupting the writing of information in the third track on the magnetic medium at a position coinciding with a position of first occurring first servo information embedded in the second track;

means for measuring and storing the amplitude of the first servo information;

means for resuming writing information in the third track;

means for interrupting the writing of information in the third track on the magnetic medium at a position coinciding with a position of a subsequently occuring first servo information embedded in the second track;

means for measuring and storing the amplitude of the subsequently occurring first servo information embedded in the second track;

means for supplying a reference differential indicating a predetermined lateral relationship between tracks;

means for comparing a difference between the two stored amplitude measurements of the first servo information with the reference differential; and means for adjusting the lateral position of writing in the third track in response to the comparison when said comparison falls outside the reference differential to bring the third track into the predetermined lateral relationship with the second track.

* * * * *